July 13, 1965 L. MAILOFF 3,194,423
PORTION RECEPTACLES FOR YOGHURT MILK AND THE LIKE
Filed Dec. 5, 1963 2 Sheets-Sheet 1

INVENTOR.
Lazare Mailoff
BY
Watson Cole, Grindle & Watson
Attys.

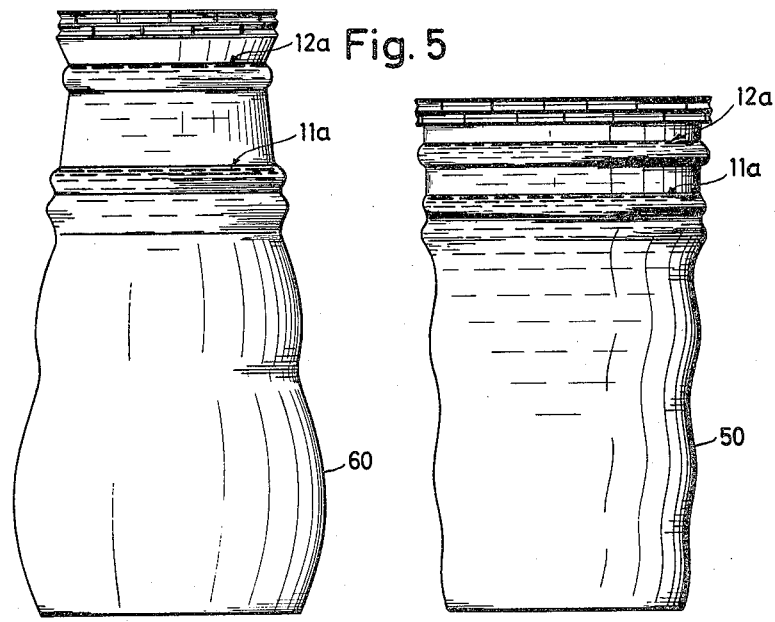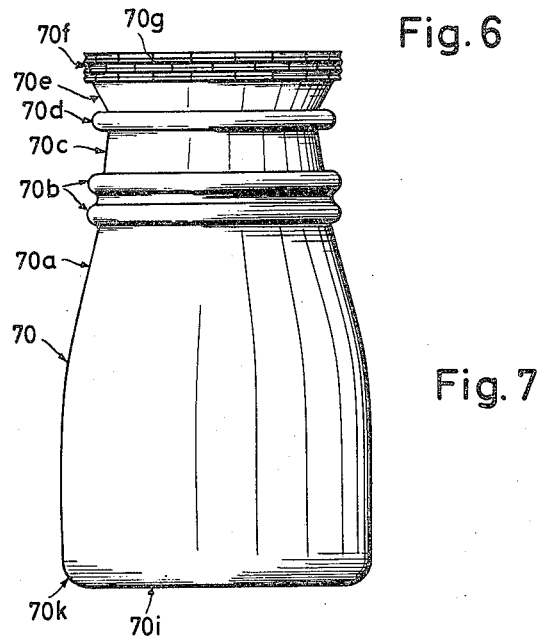

3,194,423
PORTION RECEPTACLES FOR YOGHURT MILK
AND THE LIKE
Lazare Mailoff, Josefinenstrasse 7a, Sigmaringen,
Hohenzollern, Germany
Filed Dec. 5, 1963, Ser. No. 328,414
Claims priority, application Germany, Dec. 7, 1962,
M 55,051
3 Claims. (Cl. 215—1)

The invention relates to a portion receptacle particularly of transparent or translucent material for yoghurt milk and similar milk preparations. When handling filled receptacles, especially in transport, if a receptable is tilted, the pudding-like filling easily becomes detached from the receptacle wall. This objection occurs chiefly in the case of glass jars fresh from the factory which retain from the manufacturer a film which repells the filling or those receptacles which have been washed using a strong relaxing detergent, for example containing chlorine. This is objectionable in itself, because the coherency of the filling is also destroyed thereby and it easily assumes a pappy, semiliquid consistency which is regarded as defective in quality. The detaching of the filling from the receptacle wall is far more objectionable for the appetizing appearance in the case of so-called fruit-yoghurt. Here a layer of confection is spread on the surface of the yoghurt. If the yoghurt filling becomes detached from the wall of the receptacle, the generally highly colored juice of the confection can then run down between the wall of the receptacle and the yoghurt filling and covers the milk-white yoghurt filling. This occurs particularly in the case of relatively long storage, especially when the temperature in the cold storage room exceeds 8° C. or when mistakes have been made in preparing the yoghurt milk, for example when the milk is overheated during the inoculation with fungus culture, overheating the fermenting or converting apparatus, the conversion period is exceeded, the cooling is started too late, because then a layer of whey collects on the surface; this dissolves the confection and in turn contributes to the above-mentioned manifestations. The package then has a spoiled appearance.

The invention overcomes this objection by providing the wall of the receptacle with protrusions and depressions, at least in the vicinity of the level of the filling, in order to increase the adhesion of the filling to the receptacle wall. When pouring the inoculated milk at fermentation temperature into the portion receptacle, it penetrates the depressions and conforms to the shape thereof so that when it has cooled and set the filling adheres considerably more firmly to the receptacle wall than if this were smooth, that is without protrusions and depressions. It is particularly advantageous to provide a continuous peripheral groove at such a height that, when the desired quantity of yoghurt has been poured into the receptacle the level of the yoghurt is at least at half the height of the groove but preferably at the upper edge thereof. The groove then acts as a seal against the confection juice so that this juice cannot run down and form streaks between the receptacle wall and the yoghurt filling. To improve the adhesion between the receptacle wall and the yoghurt filling, for example a herring-bone or similar close pattern for protrusions and depressions can also be applied on the wall of the receptacle. It is, however, recommended that means furthering the adhesion to the receptacle wall be also applied in the region of the layer of confection in the case of fruit-yoghurt; the juice which may have formed on the surface of the confection will then be prevented from running down between the layer of confection and the wall of the receptacle.

Other features and advantages of the invention will become apparent from the following description of embodiments illustrated by way of example in the accompanying drawings and characterized in the claims. These embodiments are in each case shown in elevation and diagrammatically in the drawings, in which:

FIGS. 5 and 6 are side elevational views showing two yoghurt receptacles with wavy wall;

FIG. 7 is a side elevational view showing a yoghurt receptacle with a smooth bulged wall.

Figure 1:
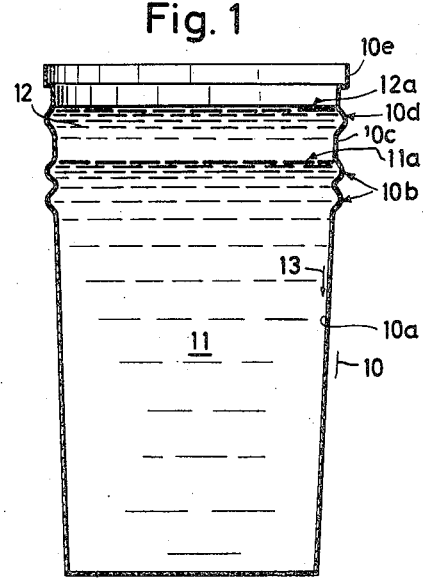
FIGS. 1 to 4 are vertical sectional views showing four different yoghurt receptacles which are intended for receiving fruit-yoghurt and provided with smooth tapering walls.

In the case of the receptacle 10 illustrated in FIG. 1, which is to be made from pliable material, the level of the yoghurt filling 11 is designated by 11a; 12 is a layer of confection up to the level 12a. At the height of the yoghurt level 11a two peripheral grooves 10b are pressed in the receptacle wall 10a and it can be seen that the level 11a is just below or at the upper edge of the groove 10b where it again merges into the narrower smooth section 10c of the receptacle wall. Thus the adhesion of the yoghurt filling 11 to the receptacle wall 10a, 10b is increased with the result that the confection juice, possibly mixed with whey which may have collected on the surface 11a, is prevented from running down between the receptacle wall 10a and the yoghurt filling 11 (see arrow 13). Similarly the groove 10d formed at the upper edge of the receptacle prevents the confection juice collecting on the surface 12a from running down between the receptacle wall and the confection layer 12. The upper edge of the receptacle 10 which is intended to receive the closure is designated by 10e.

Figure 2:
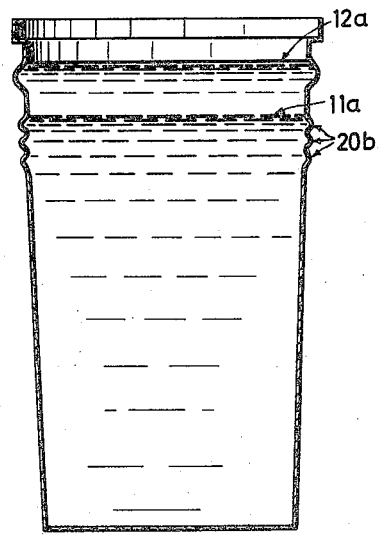

The receptacle illustrated in FIG. 2 differs from that shown in FIG. 1 in that at the height of the yoghurt level 11a grooves 20b, three in number, are pressed close together in the receptacle wall 11a; they are somewhat shallower than the grooves 10b of the receptacle illustrated in FIG. 1.

Figure 3:
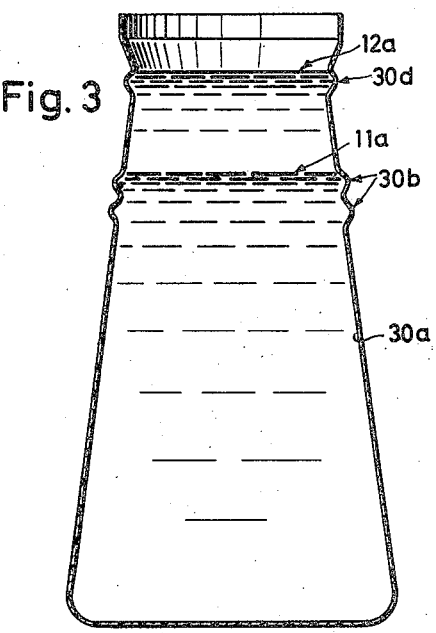
Figure 4:
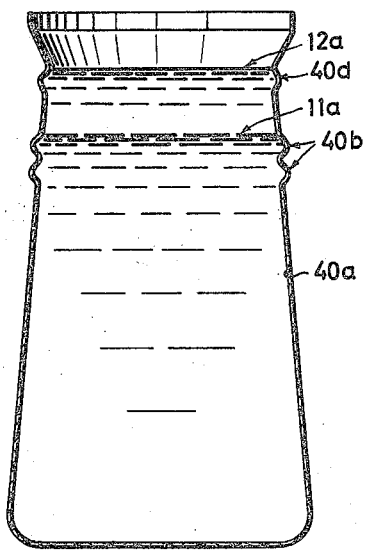

The receptacles illustrated in FIGS. 3 and 4 have, like the receptacle shown in FIG. 1, a double groove 30b, 40b respectively at the height of or just below the level 11a. The receptacles differ from the receptacles illustrated in FIGS. 1 and 2 in that the receptacle body 30a respectively 40a of FIGS. 3 and 4 is constructed as a cone widening towards the bottom. The strength of the vessel or receptacle is thus increased to better withstand crushing.

The receptacles illustrated in FIGS. 5 and 6, which are again provided with grooves at the height of the yoghurt and confection level 11a and 12a, differ from the receptacles shown in FIGS. 1 to 4 in that the receptacle bodies 50 and 60 respectively are wavy or provided with undulations extending in transverse direction with the object of imparting greater strength or rigidity to the receptacles and increasing their resistance against crushing.

The receptacle having the shape illustrated in FIG. 7 has, after many experiments, proved particularly practical as regards manufacture as well as in use. The slim body 70 of the receptacle has a wall first rising almost in the form of a cylinder from the bottom, then tapering in a slight bulge up to the neck 70a. This is followed, as in the constructions shown in FIGS. 1, 3, 4, 5 and 6, by a protruding double groove 70b the individual grooves of which have the same diameter, above this a smooth intermediate section 70c forming an extension of the neck bulge, then a single groove 70d, a transition zone 70e widening in funnel shape in upward direction and then the cylindrical band-like edge 70f of the receptacle which is strengthened by grooves and ribs 70g and, as is known, serves for pressing on a closing member for example made from aluminum foil. At the transition from the side wall to the bottom 70k a sharply rounded portion 70i is provided.

The beaker in the example illustrated is made from polystrol of about the thickness of a medium-thick drawing cardboard and weighs about 10 gr. The receptacle is about 105 mms. in height, the bottom diameter about 60 mms., the neck diameter at the narrowest point about 40 mms., the distance between the lowermost groove and the bottom about 70 mms., and the depth of the grooves between 2 and 4 mms. The receptacle wall has proved to be very strong and resistant against crushing, buckling and breaking.

What is claimed is:

1. Portion receptacle for yoghurt milk or the like milk products having in the prepared state a pudding-like consistency comprising a container having an upper open rim adapted to receive a closure member thereon, said container having a bottom portion and a side wall extending from the bottom portion to the rim, said side wall having at least one groove therein near the upper part of the side wall which governs the upper surface filling of yoghurt which flows into the groove spaced from the rim of the container to tend to prevent separation of the yoghurt by agitation of the receptacle, the groove forming a rib projecting outwardly from the side wall of the container and the width of the groove approximating the depth of the groove.

2. Portion receptacle according to claim 1, in which the depth of the groove is between 2 and 4 mm.

3. Portion receptacle for yoghurt milk or the like milk products having in the prepared state a pudding-like consistency comprising a container having an upper open rim adapted to receive a closure member thereon, said container having a bottom portion and a side wall extending from the bottom portion to the rim, said side wall having at least one internally-faced groove near the upper part of the side wall which governs the upper surface filling of yoghurt and which is formed to maintain the upper surface of the yoghurt by the groove, and a further internally-faced groove spaced from the first-mentioned groove between it and the open rim and a narrow smooth section between the grooves, said second-mentioned groove adapted to receive a confection flavor material therein which, by means of the first-mentioned groove prevents mixing with the yoghurt upon agitation of the receptacle and also prevents the flavor material from creeping down along the inner wall of the receptacle to thereby maintain the yoghurt in the receptacle in its original condition, and each groove being formed by a rib projecting outwardly from the wall of the container and the width of each groove approximates the depth thereof.

References Cited by the Examiner

UNITED STATES PATENTS 3,118,562   1/64   Whitney _____ 220—42

JOSEPH R. LECLAIR, *Primary Examiner.*

FRANKLIN T. GARRETT, GEORGE O. RALSTON, *Examiners.*